United States Patent [19]

Kawamoto et al.

[11] Patent Number: 5,361,371
[45] Date of Patent: Nov. 1, 1994

[54] MICROPROCESSOR WITH RESET EXECUTION FROM AN ARBITRARY ADDRESS

[75] Inventors: Kohji Kawamoto; Yukihiko Shimazu; Toshiki Fujiyama, all of Itami, Japan

[73] Assignee: Mitsubishi Denki Kabushiki Kaisha, Tokyo, Japan

[21] Appl. No.: 966,123

[22] Filed: Oct. 22, 1992

Related U.S. Application Data

[63] Continuation of Ser. No. 450,358, Dec. 13, 1989, abandoned.

[30] Foreign Application Priority Data

Dec. 21, 1988 [JP] Japan ................... 63-324234

[51] Int. Cl.$^5$ .............. G06F 9/22; G06F 9/26; G06F 9/312; G06F 9/445
[52] U.S. Cl. ................ 395/800; 364/221.7; 364/229; 364/229.5; 364/230.5; 364/242.5; 364/246.91; 364/246.92; 364/255.1; 364/265.3; 364/267.91; 364/267.8; 364/275.5; 364/280.3; 364/285.2; 364/DIG. 1; 364/DIG. 2
[58] Field of Search ............ 395/800, 375, 500, 425, 395/650, 775, 575, 700, 725, 400, 200, 275, 250, 325; 364/DIG. 1, DIG. 2

[56] References Cited

U.S. PATENT DOCUMENTS

| 4,136,400 | 1/1979 | Caswell et al. | 364/900 |
|---|---|---|---|
| 4,165,534 | 8/1979 | Dummermuth et al. | 364/900 |
| 4,172,289 | 10/1979 | Struger et al. | 364/900 |
| 4,403,284 | 9/1983 | Sacarisen et al. | 364/200 |
| 4,494,196 | 1/1985 | Greer | 364/200 |
| 4,519,033 | 5/1985 | Vaughn et al. | 364/200 |
| 4,574,344 | 3/1986 | Harris et al. | 364/200 |
| 4,747,040 | 5/1988 | Blanset et al. | 395/650 |
| 4,812,972 | 3/1989 | Chastain et al. | 364/200 |
| 4,868,738 | 9/1989 | Kish et al. | 364/200 |
| 4,879,648 | 11/1989 | Cochran et al. | 395/275 |
| 4,949,298 | 8/1990 | Nakanishi et al. | 395/425 |
| 4,960,982 | 10/1990 | Takahira | 235/382 |
| 5,019,970 | 5/1991 | Yamaguchi et al. | 395/375 |
| 5,101,342 | 5/1992 | Namimoto | 395/800 |

FOREIGN PATENT DOCUMENTS 62-24326 7/1987 Japan.

OTHER PUBLICATIONS

"User's Manual for High-Function CMOS Digital Signal Processor" MN1901/1909, May 1987.
Electronic Circuits and Devices, 3rd edition Ralph, J. Smith, John Wiley & Sons, 1987.

Primary Examiner—Alyssa H. Bowler
Assistant Examiner—Daniel H. Pan
Attorney, Agent, or Firm—Townsend and Townsend

[57] ABSTRACT

A microprocessor which, following a reset signal, permits execution beginning from an arbitrary address. The microprocessor is constituted in a manner such that arbitrary data is set in advance in a data register as an address. The address in the data register is given to a program counter by a register indirect jump instruction which does not originate in the instruction ROM. The microprocessor has a resetting function in addition to the normal resetting function. The normal resetting function includes re-executing a program from a predetermined address, such as a zero address. The normal resetting function occurs in the case where the logical level of a control signal input terminal is a predetermined level at a point of time when the reset signal to the reset terminal is cleared. When the control signal is at a different level, the arbitrary data set in the data register is transferred to the program counter by the register indirect jump instruction and is set in the program counter. The program is then re-executed with that data set as an instruction start address.

1 Claim, 13 Drawing Sheets

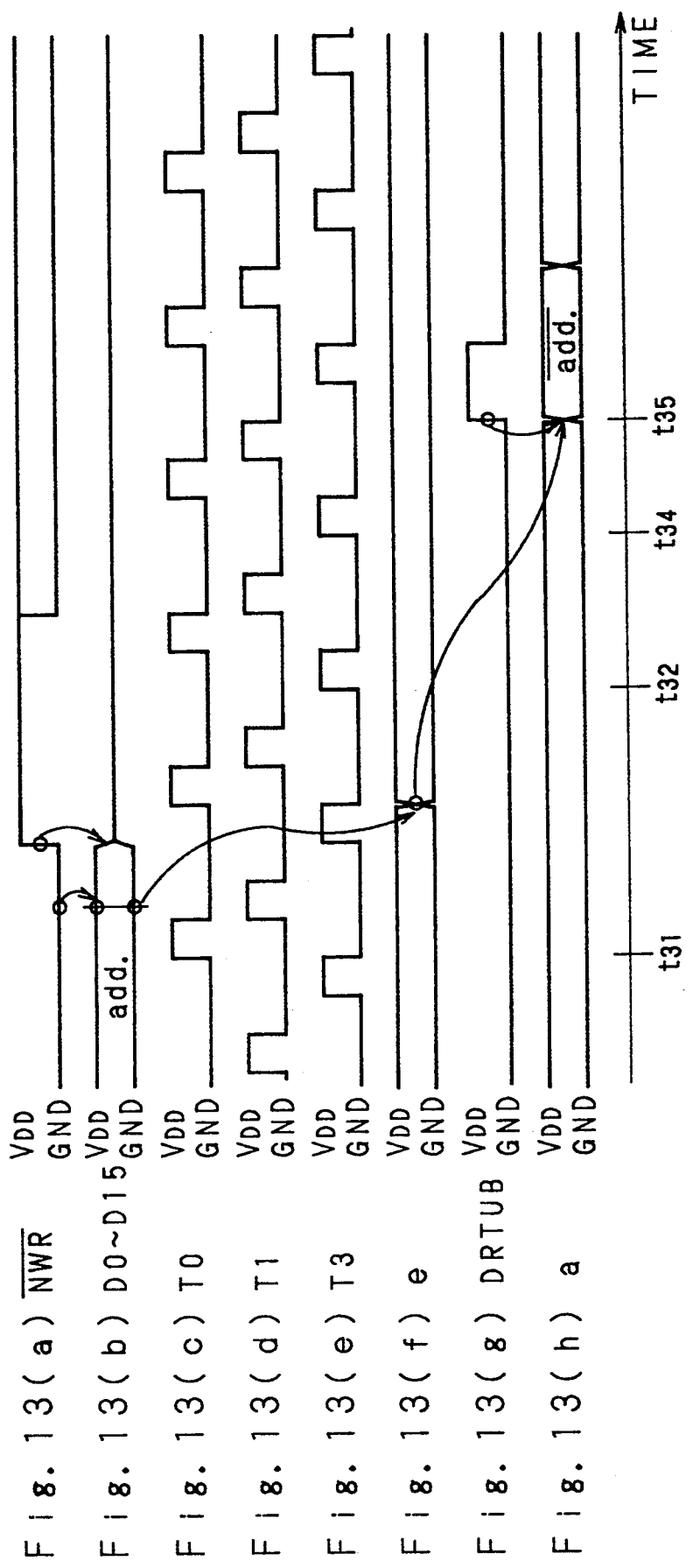

MICROPROCESSOR WITH RESET EXECUTION FROM AN ARBITRARY ADDRESS

This is a continuation of Ser. No. 07/450,358, filed Dec. 13, 1989, now abandoned.

BACKGROUND OF THE INVENTION

1. Field of the Invention

The present invention relates to a microprocessor with a built-in instruction ROM type, and to be further detailed, relates to a microprocessor capable of re-executing a program from an arbitrary instruction address in resetting.

2. Description of Related Art

First, description is made on the conventional microprocessor taking MN1901 as an example from "User's Manual for High-Function CMOS Digital Signal Processor MN1901/MN1909" prepared by Matsushita Denko Co., Ltd. in reference to drawings.

FIG. 1 is a block diagram showing a configuration of a major part of the above-described microprocessor MN1901.

In FIG. 1, numeral 51 designates a parallel port (data register) used for input/output of parallel data.

Input/output signals to/from this parallel port 51 are as follows. Symbols P0 to P15 designate 16-bit parallel data input/output signals. These 16-bit parallel data input/output signals are inputted or outputted through a parallel data input/output terminal 57. Symbol $\overline{PCS}$ designates a port select signal showing that data transfer can be made through the parallel port 51 when it is of low logical level (GND). Symbol PR/$\overline{W}$ designates a port read/write control signal which shows data output from the parallel port 51 when it is of high logical level ($V_{DD}$) and shows data input to the parallel port 51 when it is of low logical level (GND). Symbol $\overline{PDS}$ designates an input/output timing signal showing to perform data transfer when it is of low logical level (GND).

Numeral 52 designates an instruction memory (instruction ROM) storing instruction codes, wherein individual instructions constituting a program to be executed by this microprocessor are stored.

Numeral 53 designates an instruction pointer (program counter) pointing an address to the instruction memory 52. An instruction stored in an address of the instruction memory 52 pointed by this instruction pointer 53 is outputted from the instruction memory 52.

Numeral 54 designates an instruction register, which temporarily holds the instruction outputted from the instruction memory 52.

Numeral 55 designates a decoder and instruction execution unit, which decodes and executes the instruction held in the instruction register 54.

Numeral 56 designates a reset control unit. A signal $\overline{RST0}$ inputted to this reset control unit 56 is a signal for resetting and starting this microprocessor when it is of low logical level (GND), and a signal $\overline{RST}$ is a reset start signal thereof.

Numerals 58 and 59 designate internal buses, and the parallel port 51 and the instruction pointer 53 are connected through these buses.

Next, description is made on operation of the conventional microprocessor having the configuration as described above.

FIG. 2 is a timing chart showing timing relation among the port select signal $\overline{PCS}$(a) when data is written to the parallel port 51 from exterior, the port read/- write control signal PR/$\overline{W}$(b), the input/output timing signal $\overline{PDS}$(c) and the parallel data input/output signals P0 to P15(d).

First, as shown in FIG. 2(a), the port select signal $\overline{PCS}$ is turned to the low logical level (GND), and thereby data transfer through the parallel port 51 is made possible. Next, as shown in FIG. 2(b), the port read/write control signal PR/$\overline{W}$ is turned to the low logical level (GND), and is set to the state capable of data input to the parallel port.

Thereafter, as shown in FIG. 2(c), the input/output timing signal $\overline{PDS}$ is turned temporarily to the low logical level (GND), and thereafter returned to the high logical level ($V_{DD}$), and thereby, as shown in FIG. 2(d), the parallel data P0 to P15 are written to an input data buffer (not illustrated) in the parallel port 51.

FIG. 3 is a flowchart showing a procedure of reset processing.

In FIG. 3, when the reset signal $\overline{RST0}$ to the reset control unit 56 is turned to the low logical level (GND) which is active over a period of one machine cycle or more (step S1), the signal $\overline{RST}$ which is an output of the reset control unit 56 is turned to the low logical level (GND) (step S2). Thereby, the instruction pointer 53 is reset and the content thereof is initialized to an address 0 (step S3). Accordingly, after reset has been cleared, instructions are read into the instruction register 54 in sequence from the instruction stored in the address 0 of the instruction memory 52, being executed sequentially.

FIG. 4 is a flowchart showing a procedure of a register indirect jump instruction by performing data input from the parallel port 51.

The register indirect jump instruction is executed in a manner that the parallel data P0 to P15, which is inputted from the parallel port 51 and held temporarily in a buffer memory (not illustrated) in the parallel port 51 (step S11), are transferred to the instruction pointer 53 (step S12).

Since the conventional microprocessor is constituted as described above, there has been a problem that in resetting it, the instruction pointer is reset always to the same value, and a program can be re-executed only from the fixed address of the instruction ROM wherein the program is stored.

SUMMARY OF THE INVENTION

The present invention has been achieved to eliminate the problem as described above, and the primary object thereof is to provide a microprocessor capable of resuming execution of a program from an arbitrary address of an instruction ROM by resetting the microprocessor.

A microprocessor in accordance with the present invention is constituted in a manner that in addition to the normal resetting function of re-executing a program from a predetermined address, an arbitrary data is set in advance as an address in a data register, and thereby that data is given to a program counter by a register indirect jump instruction. By adopting such a configuration, in the case where the logical level of a control signal input terminal when a reset signal at a reset terminal is cleared is in a certain state, an arbitrary data set in the data register is transferred by the register indirect jump instruction, and is set in a program counter, and the program is re-executed with that data set as an instruction start address.

The above and further objects and features of the invention will more fully be apparent from the following detailed description with accompanying drawings.

BRIEF DESCRIPTION OF THE DRAWINGS

FIG. 13 is a timing chart for explaining operation of the same.

DESCRIPTION OF THE PREFERRED EMBODIMENTS

Hereinafter, detailed description is made on the present invention based on drawings showing embodiments thereof.

Figure 1:
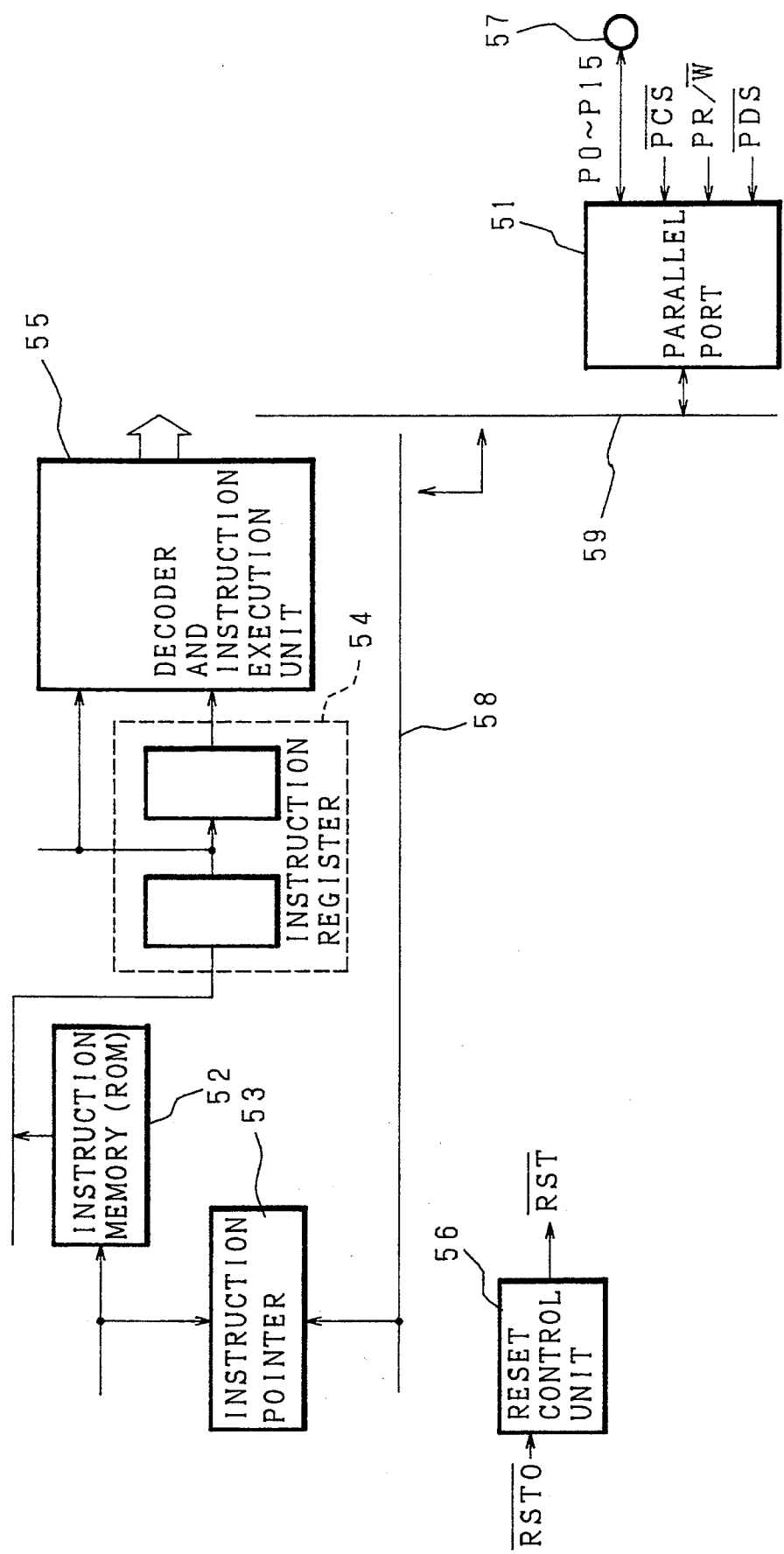
FIG. 1 is a block diagram showing a configuration of a conventional microprocessor.
Figure 2:
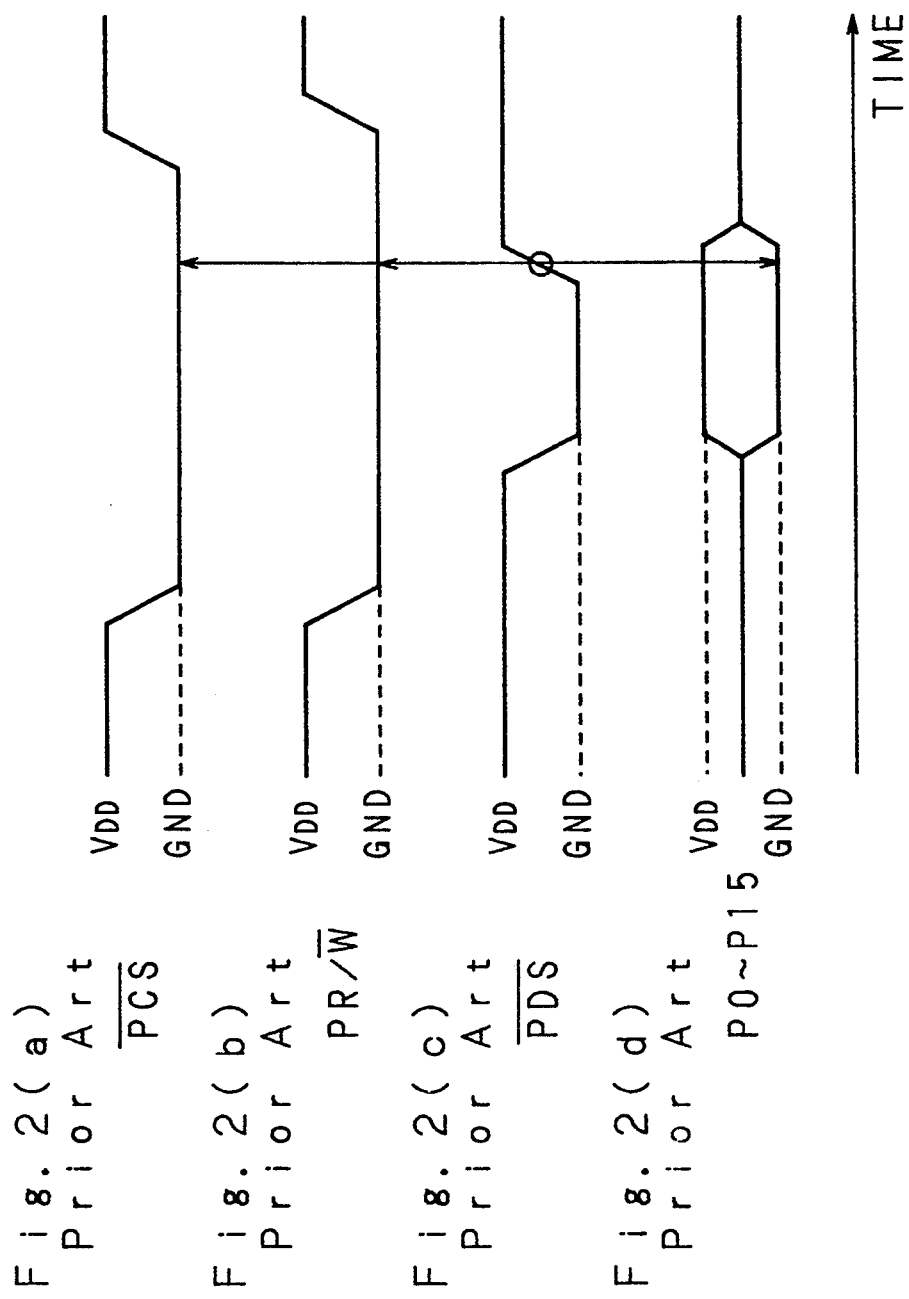
FIG. 2 is a timing chart for explaining operation of data writing from exterior to a parallel port of the same.
Figure 3:
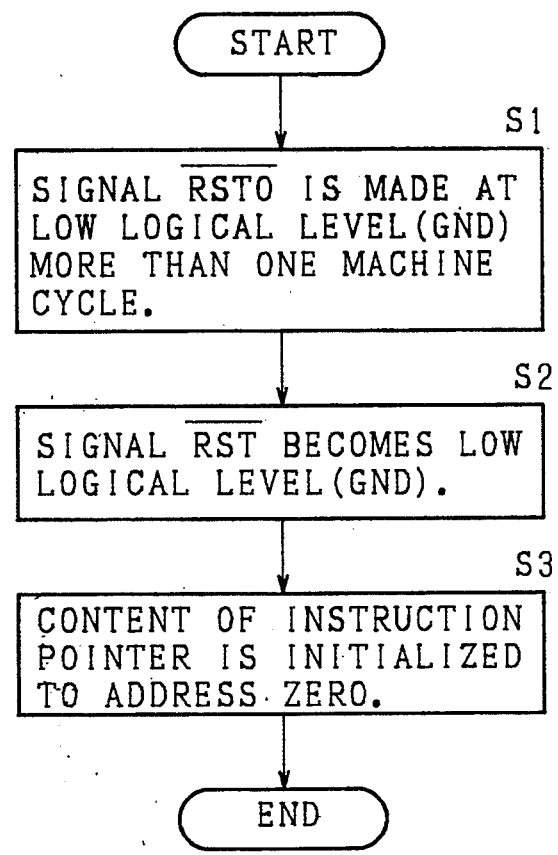
FIG. 3 is a flowchart showing a procedure of reset processing in the conventional example.
Figure 4:
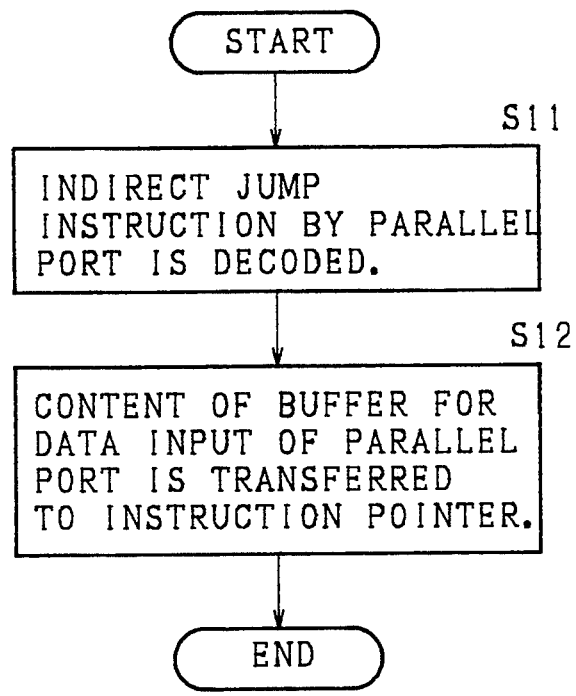
FIG. 4 is a flowchart showing a procedure of an indirect jump instruction by means of the parallel port of the conventional example.
Figure 5:
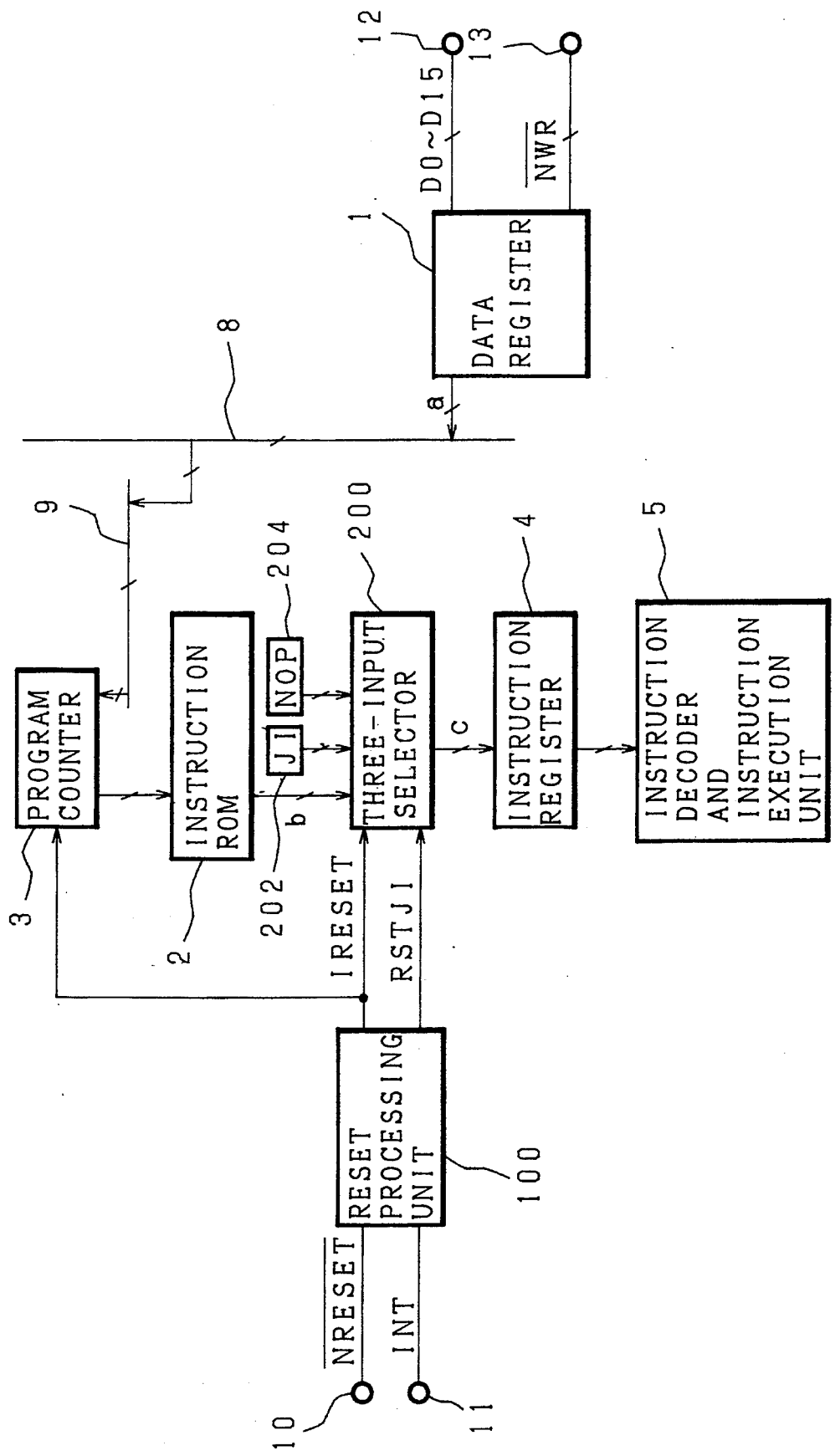
FIG. 5 is a circuit diagram showing one embodiment of a microprocessor in accordance with the present invention.

FIG. 5 is a block diagram showing a major part of one example of configuration of a microprocessor in accordance with the present invention.

In FIG. 5, numeral 1 designates a data register used for input of parallel data.

This data register 1 is provided with a parallel data input terminal 12 and a control signal input terminal 13. 16-bit parallel data input signals D0 to D15 are inputted to the parallel data input terminal 12. Also, a write control signal $\overline{NWR}$ is inputted to the control signal input terminal 13. This write control signal $\overline{NWR}$ causes data input to the data register 1 when it is of low logical level (GND).

Numeral 2 designates an instruction ROM storing instruction codes, wherein individual instructions constituting a program to be executed by the microprocessor of the present invention are stored in a form of code.

Numeral 3 designates a program counter giving an address for an instruction ROM 2, and an instruction stored in the address of the instruction ROM 2 pointed by this program counter 3 is read from the instruction ROM 2.

Numeral 4 designates an instruction register, which temporarily holds the instruction read from the instruction ROM 2.

Numeral 5 designates an instruction decoder and instruction execution unit, which decodes and executes the instruction held in the instruction register 4.

Numerals 8 and 9 designate internal buses, and the data register 1 and the program counter 3 are connected by these buses.

Numeral 100 designates a reset processing unit as a selecting means, which is provided with a reset terminal 10 and a reset select signal input terminal 11.

A reset signal $\overline{NRESET}$ is inputted to the reset terminal 10. The reset signal $\overline{NRESET}$ resets and starts the microprocessor of the present invention when it is of low logical level (GND). Also, a reset select signal INT is inputted to the reset select signal input terminal 11. The reset select signal INT is inputted to make the microprocessor of the present invention select either of two kinds of resetting operations, that is, a first reset processing as a normal resetting which re-executes an instruction from an address 0 of the instruction ROM 2 and a second reset processing capable of re-executing reset processing from an arbitrary address.

Also, the reset processing unit 100 outputs two signals of an internal reset signal IRESET and a data register indirect jump select signal RSTJI to a three-input selector 200, and outputs the internal reset signal IRESET to the program counter, respectively.

The internal reset signal IRESET, when it is of high logical level ($V_{DD}$), shows that the microprocessor of the present invention is in the reset state, resets the program counter 3 to the address 0, and makes the three-input selector 200 select a signal NOP as an input signal.

The data register indirect jump select signal RSTJI, when it is of high logical level ($V_{DD}$), makes the three-input selector 200 select a signal JI as an input signal.

A three-input selector has a first input coupled to the output of the instruction ROM 2, a second input coupled to a JI source 202, and a third input coupled to a NOP source 204. These sources may be hard-wired logic and can be included in the selector.

The three-input selector 200 selects any one of three inputs of an instruction code signal b given from the instruction ROM 2, the instruction code signal JI of the data register indirect jump instruction and the instruction code signal NOP of a no-operation instruction of performing nothing other than renewal of the program counter 3, and outputs it to the instruction register 4 as an instruction code signal c.

In addition, symbol a designates a data signal from the data register 1 to the internal bus 8.

Next, description is made on operation of the microprocessor of the present invention whose configuration is shown in FIG. 5 as described above in reference to a timing chart in FIG. 6.

Figure 6:
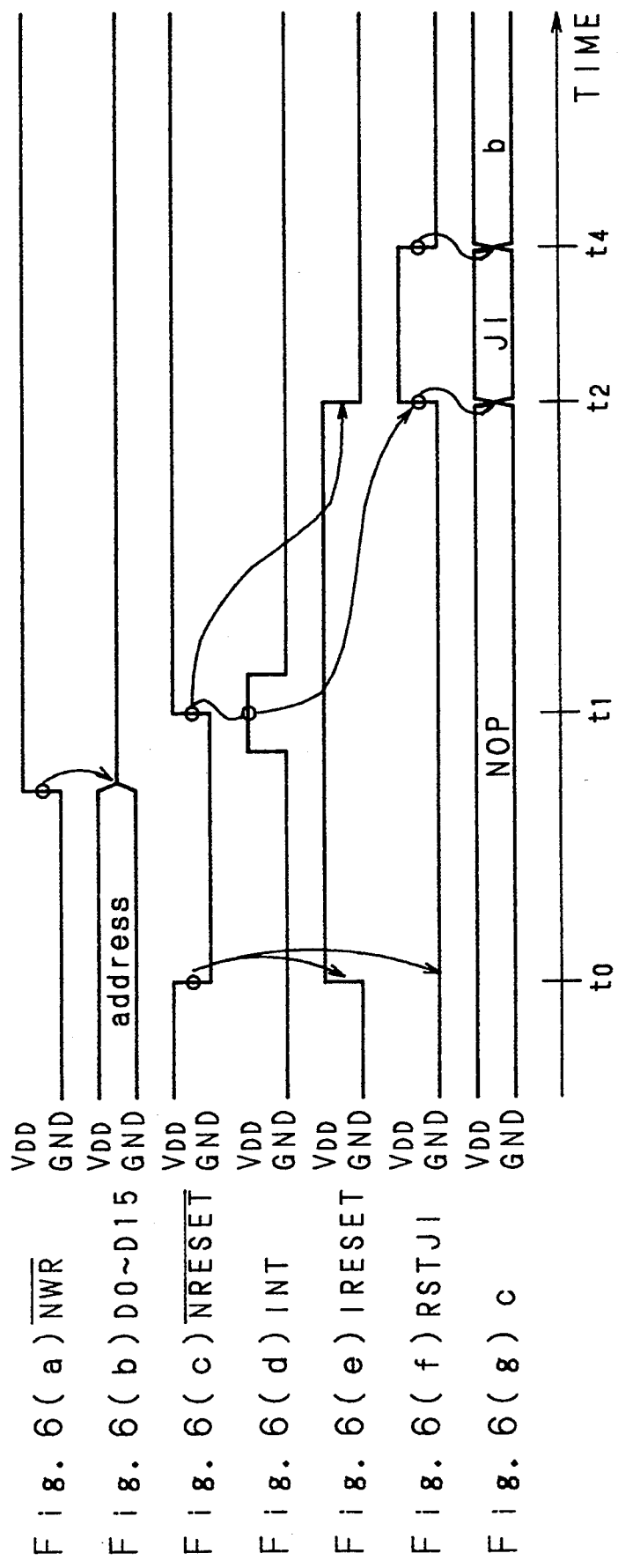
FIG. 6 is a timing chart for explaining operation of the same.

FIG. 6 shows timing charts of the data register write signal $\overline{NWR}$ (a), the parallel input data signals D0 to D15(b), the reset signal $\overline{NRESET}$(c), the reset select signal INT(d), the internal reset signal IRESET (e), the data register indirect jump select signal RSTJI(f) and the instruction register input signal c(g) respectively, in performing the second reset processing.

First, before resetting, the data register write signal $\overline{NWR}$ is turned to the low logical level (GND), and thereby the data register 1 fetches the parallel data input signals D0 to D15 through the parallel input terminal 12.

Then, at a time t0, the reset signal $\overline{NRESET}$ is turned to the low logical level (GND) and the microprocessor of the present invention is put in the reset state, and thereby the reset processing unit 100 turns the internal reset signal IRESET to the high logical level ($V_{DD}$), and turns the data register indirect jump select signal RSTJI to the low logical level (GND), respectively.

Subsequently, assume that at a time t1 when the reset signal $\overline{NRESET}$ is turned to the high logical level ($V_{DD}$) and the reset signal is cleared, the reset select signal INT is held at the high logical level ($V_{DD}$), and setting of a second reset is executed.

By setting this second reset, the reset processing unit 100 turns the internal reset signal IRESET to the low logical level (GND), and holds the select signal RSTJI of the three-input selector 200 at the high logical level ($V_{DD}$) over a period from a time t2 when the internal reset is cleared to a time t4.

As described above, when the second reset is set, the reset processing unit 100 controls the three-input selector 200, and outputs the instruction code signal NOP of the no-operation instruction during resetting operation until the time t2, and thereafter during a period from the time t2 to the time t4, stores the instruction code signal JI of the data register indirect jump instruction by the data register 1 in the instruction register 4. Then, the instruction decoder 5 decodes the instructions stored in the instruction register 4, and control is performed so that the program is executed from the address according to the reset address fetched by the data register 1 before resetting.

Figure 7:
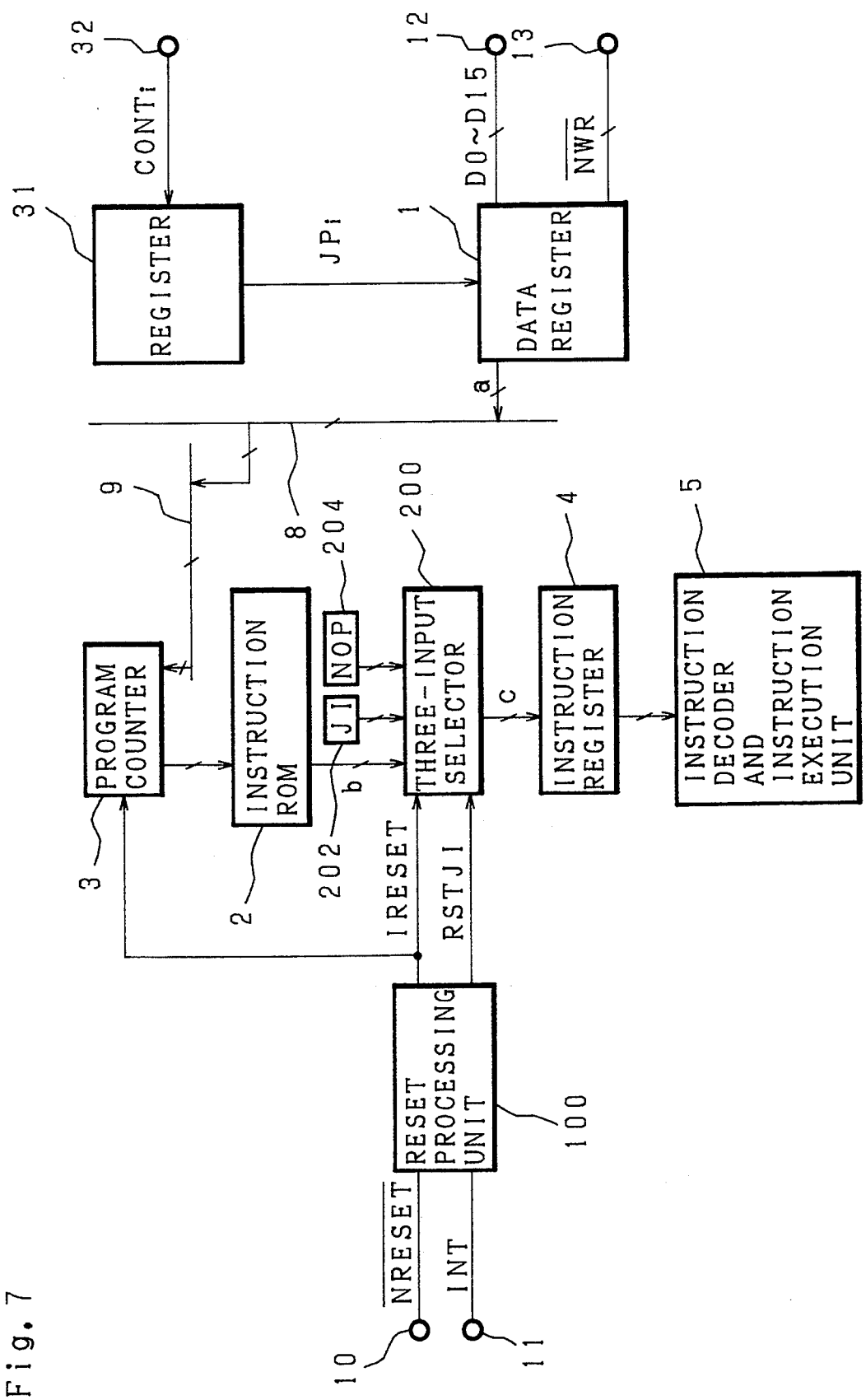
FIG. 7 is a block diagram showing a configuration of another embodiment in accordance with the present invention.

FIG. 7 is a block diagram showing another embodiment of configuration of the microprocessor of the present invention.

In this embodiment, in addition to the above-described configuration shown in FIG. 5, a register 31 is provided which stores in advance a plurality of addresses of programs to be executed at the second reset processing.

When a control signal CONTi(i=1,2...) is inputted from a control signal input terminal 32, this register 31 outputs data JPi(i=1,2...) specifying a jump address. In the data register 1, the control signal CONTi outputted from the register 31 is inputted at a point when the data register write signal $\overline{NWR}$ is turned to the low logical level (GND). Thereafter, processing is performed like the case where the parallel data D0 to D15 are inputted to the parallel data input terminal 12 in the above-described embodiment shown in FIG. 5.

Figure 8:
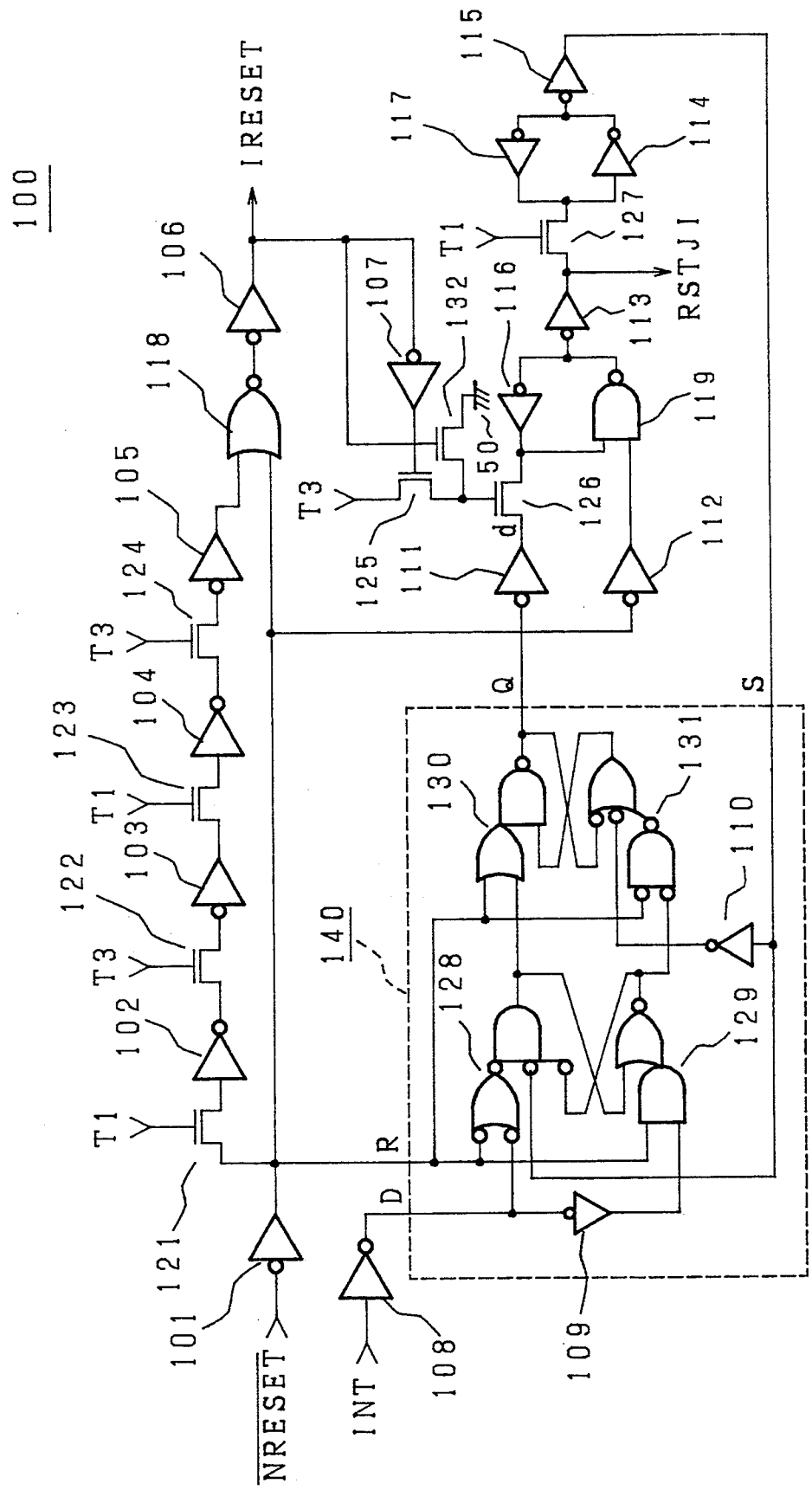
FIG. 8 is a circuit diagram in the case where a reset processing unit of the microprocessor of the present invention is materialized by a MOS transistor.

Next, a logical circuit configuration in the case where the reset processing unit 100 is materialized by MOS transistor logic is shown in a circuit diagram of FIG. 8.

In FIG. 8, numerals 101 to 115, 116 and 117 designate inverters. But, the inverters 116 and 117 are small in driving ability in comparison with the inverters 101 to 115.

Numeral 118 designates a NOR gate, and numeral 119 designates a NAND gate.

Numerals 121 to 127 and 132 designate transfer gates using an N-channel-type MOS transistor, and numerals 128, 129, 130 and 131 designate logical gates respectively, which constitute a flip-flop 140.

The flip-flop 140 controls an output signal Q by means of an input signal D, a clear signal R and a set signal S. Specifically, the flip-flop 140 turns the output signal Q to the low logical level (GND) when the clear signal R is of high logical level ($V_{DD}$), and when the clear signal R is turned to the low logical level (GND), if the set signal S is of low logical level (GND), the flip-flop 140 holds the logical level of the input signal D at the output signal Q, and further when the clear signal R is of low logical level (GND), if the set signal S is of high logical level ($V_{DD}$), it turns the output signal Q to the high logical level ($V_{DD}$).

Numeral 50 designates a ground of the low logical level (GND), and symbols T1 and T3 designate internal synchronizing signals.

Next, description is made on operation of the reset control unit 100 shown in FIG. 8.

Figure 9:
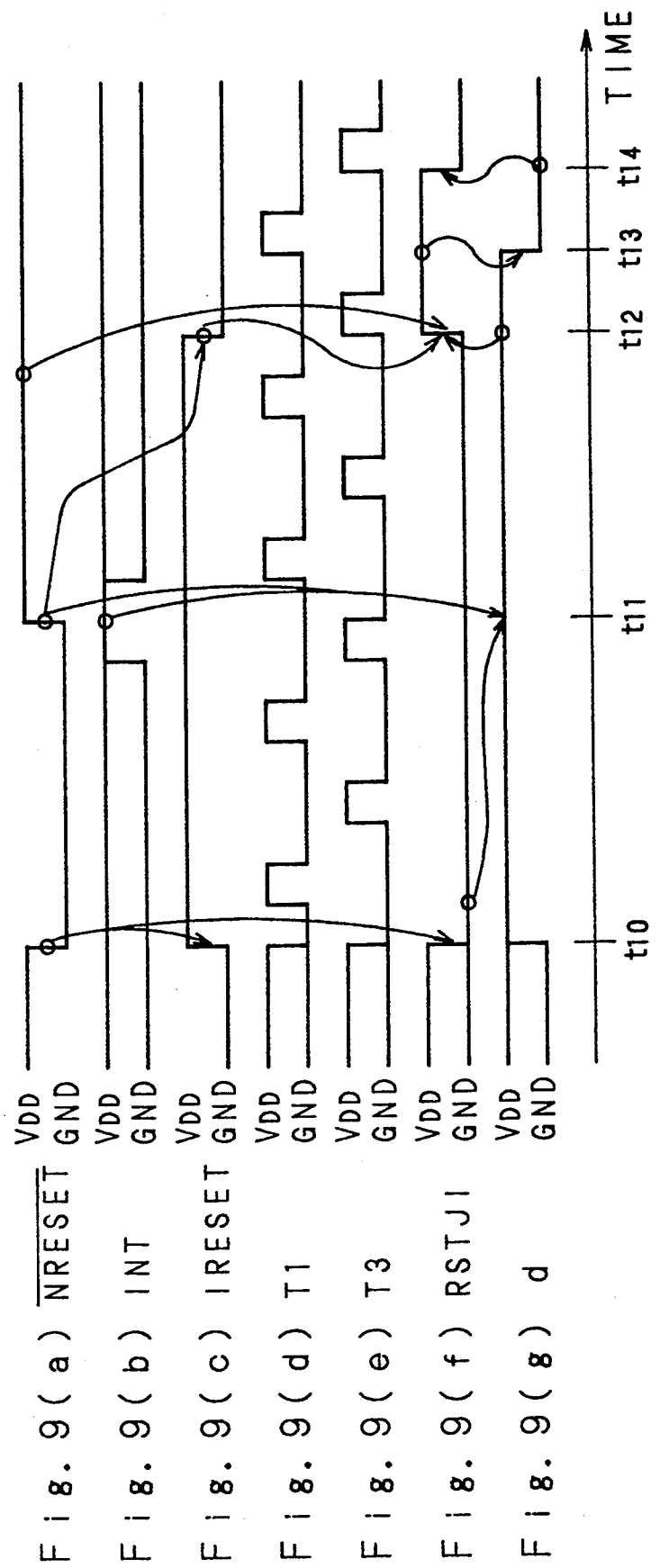
FIG. 9 is a timing chart for explaining operation of the same.

FIG. 9 shows timing charts of the reset signal $\overline{NRESET}$(a), the reset select signal INT(b), the internal reset signal IRESET(c), the internal synchronizing signal T1(d), the other synchronizing signal T3(e), the data register indirect jump select signal RSTJI(f) and the output signal d of the inverter 111(g) in performing the second reset processing.

The inverter 101, a NOR gate 118 and the inverter 106 sequentially transmits the reset signal $\overline{NRESET}$ turned to the low logical level (GND) at a time t10, and the inverter 106 turns the output signal IRESET to the high logical level ($V_{DD}$). Also, the inverter 101, the inverter 112, a NAND gate 119, the inverter 116, and the inverter 113 transmit the reset signal $\overline{NRESET}$, and the inverter 113 turns the output signal RSTJI to the low logical level (GND). Furthermore, when the internal synchronizing signal T1 is of high logical level ($V_{DD}$), the transfer gate 127, the inverters 114, 117 and 115 transmit the logical level of the signal RSTJI. The inverter 115 turns the set signal S of the flip-flop 140 to the low logical level (GND). Also, since the inverter 101 inverts the reset signal $\overline{NRESET}$ and turns the reset signal R to the high logical level ($V_{DD}$), the flip-flop 140 turns the output signal Q to the low logical level (GND). The inverter 111 inverts the output signal Q of the flip-flop 140 to generate the output signal d of high logical level ($V_{DD}$).

Note that when the common input signal IRESET to the gate of the transfer gate 132 and the inverter 107 is of high logical level ($V_{DD}$), the transfer gate 125 is not opened, and the transfer gate 132 is opened. As a result, the transfer gate 132 obtains the gate signal of the transfer gate 126 from a ground 50, setting it to the low logical level (GND). Consequently, the transfer gate 126 is not opened, and the transfer gate 125 does not transmit the logical level of the signal d to the NAND gate 119.

Subsequently, assume that at a time t11 when the reset signal $\overline{NRESET}$ is turned to the high logical level ($V_{DD}$), the reset processing signal INT is of high logical level ($V_{DD}$). At this time, the set signal S of the flip-flop 140 is of low logical level (GND). When the inverter 101 turns the clear signal R to the low logical level (GND), the flip-flop 140 holds the input signal D inverted to the low logical level (GND) and outputted by the inverter 108, and turns the output signal Q to the low logical level (GND). The inverter 111 inverts this output signal Q, and the inverter 111 holds the signal d at the high logical level ($V_{DD}$).

Subsequently, at a time t12, the inverter 101, the transfer gate 121, the inverter 102, the transfer gate 122, the inverter 103, the transfer gate 123, the inverter 104, the transfer gate 124 and the inverter 105 sequentially transmit the logical level of the signal $\overline{NRESET}$ turned to the high logical level ($V_{DD}$) at the time t11. Both of the inverters 101 and 105 turn the output signal to the low logical level (GND), and the NOR gate 118 and the inverter 106 sequentially transmit this signal, and the inverter 106 turns the output signal IRESET to the low logical level (GND). At this time, the common input signal IRESET to the gate of the transfer gate 132 and the inverter 107 is of low logical level (GND), and therefore the transfer gate 132 is closed and the transfer gate 125 is opened, and the transfer gate 125 transmits the internal synchronizing signal T3 to the gate signal of the transfer gate 126. Consequently, the inverter 111 transmits the logical level of the output signal d to one of the inputs of the NAND gate 119 when the internal synchronizing signal T3 is of high logical level ($V_{DD}$). Furthermore, the inverters 101 and 112 transmit the reset signal $\overline{NRESET}$, and the inverter 112 turns the output signal to the high logical level ($V_{DD}$), and therefore the input signals of the NAND gate 119 are both turned to the high logical level ($V_{DD}$). The NAND gate 119 turns the output to the low logical level (GND), and the inverter 131 inverts that signal, and turns the output signal RSTJI to the high logical level ($V_{DD}$).

Subsequently, when the internal synchronizing signal T1 is turned to the high logical level ($V_{DD}$) at a time t13, the transfer gate 127 and the inverters 114, 117 and 115 transmit the output signal RSTJI of the inverter 113. Consequently, the inverter 115 turns the output signal S to the high logical level ($V_{DD}$), and therefore the flip-flop 140 turns the output signal Q to the high logical level ($V_{DD}$). The inverter 111 inverts this signal, and therefore the inverter 111 turns the output signal d to the low logical level (GND).

Subsequently, when the internal synchronizing signal T3 is turned to the high logical level ($V_{DD}$) at a time t14, the transfer gate 125, the NAND gate 119 and the inverters 116 and 113 transmit the output signal d of the inverter 111. Thereby, the inverter 113 turns the output signal RSTJI to the low logical level (GND).

As described above, in the case where the reset select signal INT is set to the high logical level ($V_{DD}$) at the time t11 and the second reset processing is executed, the reset processing unit 100 turns the signal RSTJI controlling the three-input selector 200 to the high logical level ($V_{DD}$) to store the instruction JI required for executing the indirect jump instruction by the data register 1 over a period from the time t12 to the time t14, and turns the signal IRESET to the low logical level (GND).

Next, consideration is given on the case where normal resetting operation with the reset select signal INT held intact at the low logical level (GND), that is, the first reset processing is performed at the time t11.

In this case, when the reset signal $\overline{NRESET}$ is turned to the high logical level ($V_{DD}$) at the time t11, the input signal D of the flip-flop 140 is of high logical level ($V_{DD}$), and therefore the flip-flop 140 turns the output signal Q to the high logical level ($V_{DD}$), and the inverter 111 inverts it, turning the signal d to the low logical level. As a result, the signal RSTJI controlling the three-input selector 200 is not turned to the high logical level ($V_{DD}$), and therefore the second reset processing is not executed.

Figure 10:
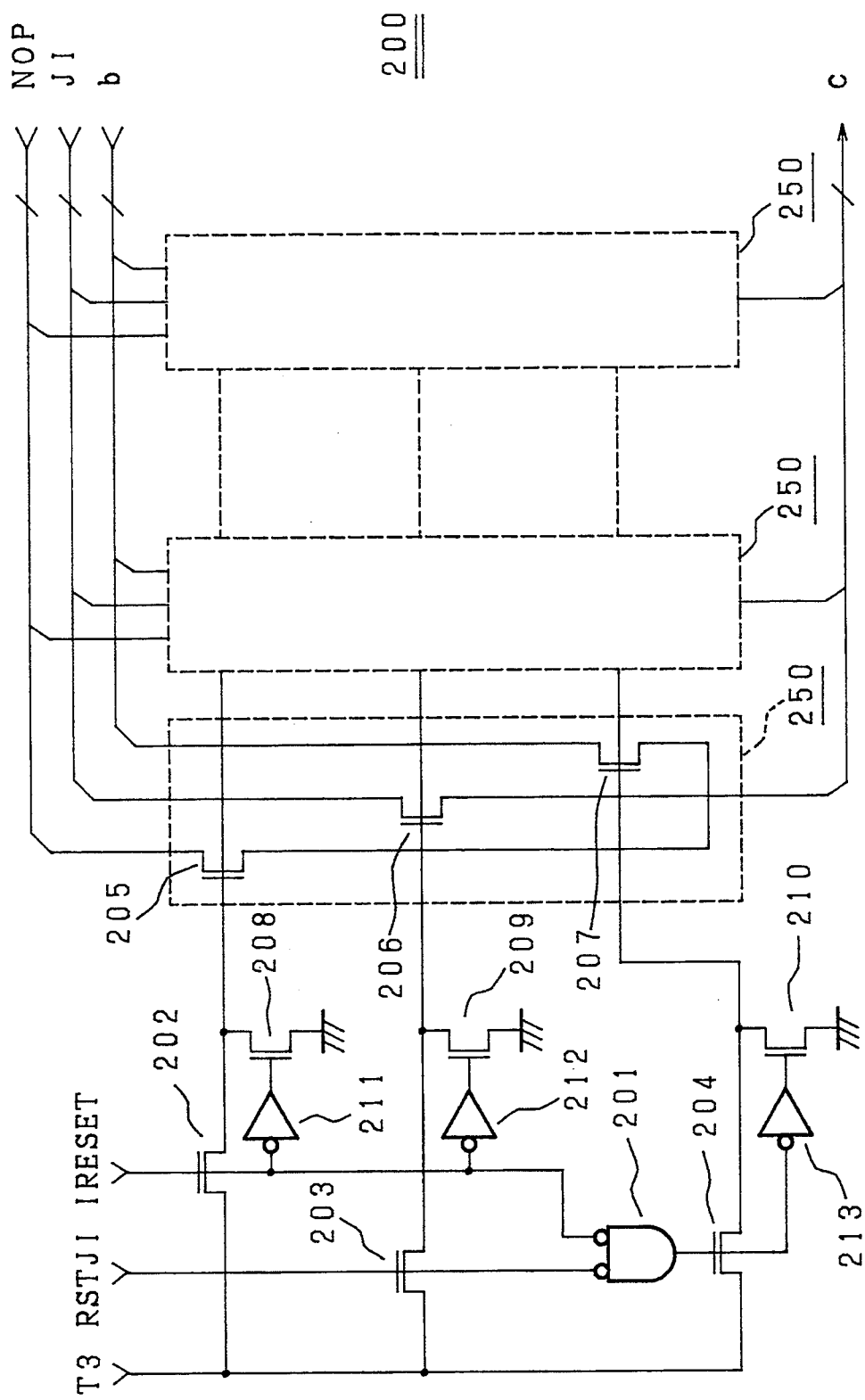
FIG. 10 is a circuit diagram in the case where a three-input selector is materialized likewise by a MOS transistor.

Next, FIG. 10 is a circuit diagram showing a logical circuit configuration in the case where the three-input selector 200 is materialized by MOS transistor logic.

In FIG. 10, numeral 201 designates a NOR gate, numerals 202 to 210 designate transfer gates using an N-channel-type MOS transistor respectively, numerals 211 to 213 designate inverters, and numeral 250 designates a selector portion of one bit of instruction code.

Next, description is made on operation of the three-input selector 200 whose configuration is shown in FIG. 10.

Figure 11:
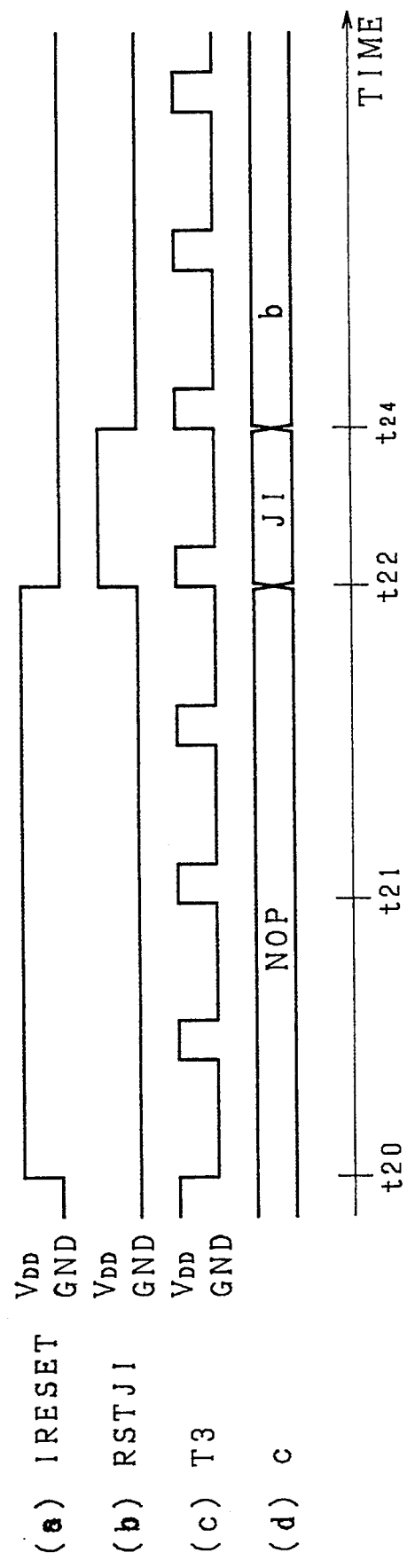
FIG. 11 is a timing chart for explaining operation of the same.

FIG. 11 shows timing charts of the internal reset signal IRESET(a), the indirect jump instruction select signal RSTJI(b), the internal synchronizing signal T3(c) and the instruction register input signal c(d) when the second reset processing is performed.

During a period from a time t20 to a time t22 wherein the internal reset signal IRESET is of high logical level ($V_{DD}$) and the indirect jump instruction select signal RSTJI is of low logical level (GND), only the transfer gate 202 among the transfer gates 202 to 204 is turned to the high logical level ($V_{DD}$), and the rest thereof are set to the low logical level (GND). Also, since one of the input signals is of high logical level ($V_{DD}$), the NOR gate 201 turns the output signal to the low logical level (GND). Consequently, the inverter 211 among the inverters 211 to 213 turns the output signal to the low logical level (GND), but the rest thereof turn the output signal to the high logical level ($V_{DD}$), and therefore only the transfer gate 208 among the transfer gates 208–210 is turned to the low logical level (GND), and the rest thereof are turned to the high logical level ($V_{DD}$).

As a result, only the transfer gate 205 among the transfer gates 205–207 is turned to the high logical level ($V_{DD}$), and the rest thereof are turned to the low logical level (GND), and therefore the three-input selector 200 outputs the instruction code signal NOP of the no-operation instruction as the output signal c.

Also, during a period from the time t22 to a time t24 wherein the internal reset signal IRESET is of low logical level (GND) and the indirect jump select signal RSTJI is of high logical level ($V_{DD}$), only the transfer gate 203 among the transfer gates 202 to 204 is turned to the high logical level ($V_{DD}$), and the rest thereof are turned to the low logical level (GND). Also, since one of the input signals is of high logical level ($V_{DD}$), the NOR gate 201 turns the output signal to the low logical level (GND). Consequently, the inverter 212 among the inverters 211 to 213 turns the output signal to the low logical level (GND), but the rest thereof turn the output signal to the high logical level ($V_{DD}$), and therefore only the transfer gate 209 among the transfer gates 208 to 210 is tuned to the low logical level (GND), and the rest thereof are turned to the high logical level ($V_{DD}$).

As a result, only the transfer gate 206 among the transfer gates 205 to 207 is turned to the high logical level ($V_{DD}$), and the rest thereof are turned to the low logical level (GND), and therefore the three-input selector 200 outputs the instruction code signal JI of the data register indirect jump instruction by the data register 1 as the output signal c.

Furthermore, after the time t24, both the internal set signal IRESET and the indirect jump select signal RSTJI are turned to the low logical level (GND), and therefore only the transfer gate 204 among the transfer gates 202 to 204 is turned to the high logical level ($V_{DD}$), and the rest thereof are turned to the low logical level (GND). Also, since both the input signals are of low logical level (GND), the NOR gate 201 turns the output signal to the high logical level ($V_{DD}$). Consequently, the inverter 213 among the inverters 211 to 213 turns the output signal to the low logical level (GND), but the rest thereof turn the output signal to the high logical level ($V_{DD}$), and therefore only the transfer gate 210 among the transfer gates 208 to 210 is turned to the low logical level (GND), and the rest thereof are turned to the high logical level ($V_{DD}$). As a result, only the transfer gate 207 among the transfer gates 205–207 is turned to the high logical level ($V_{DD}$), and the rest thereof are turned to the low logical level (GND), and therefore the three-input selector 200 outputs the output signal b from the instruction ROM 2 as the output signal c.

Figure 12:
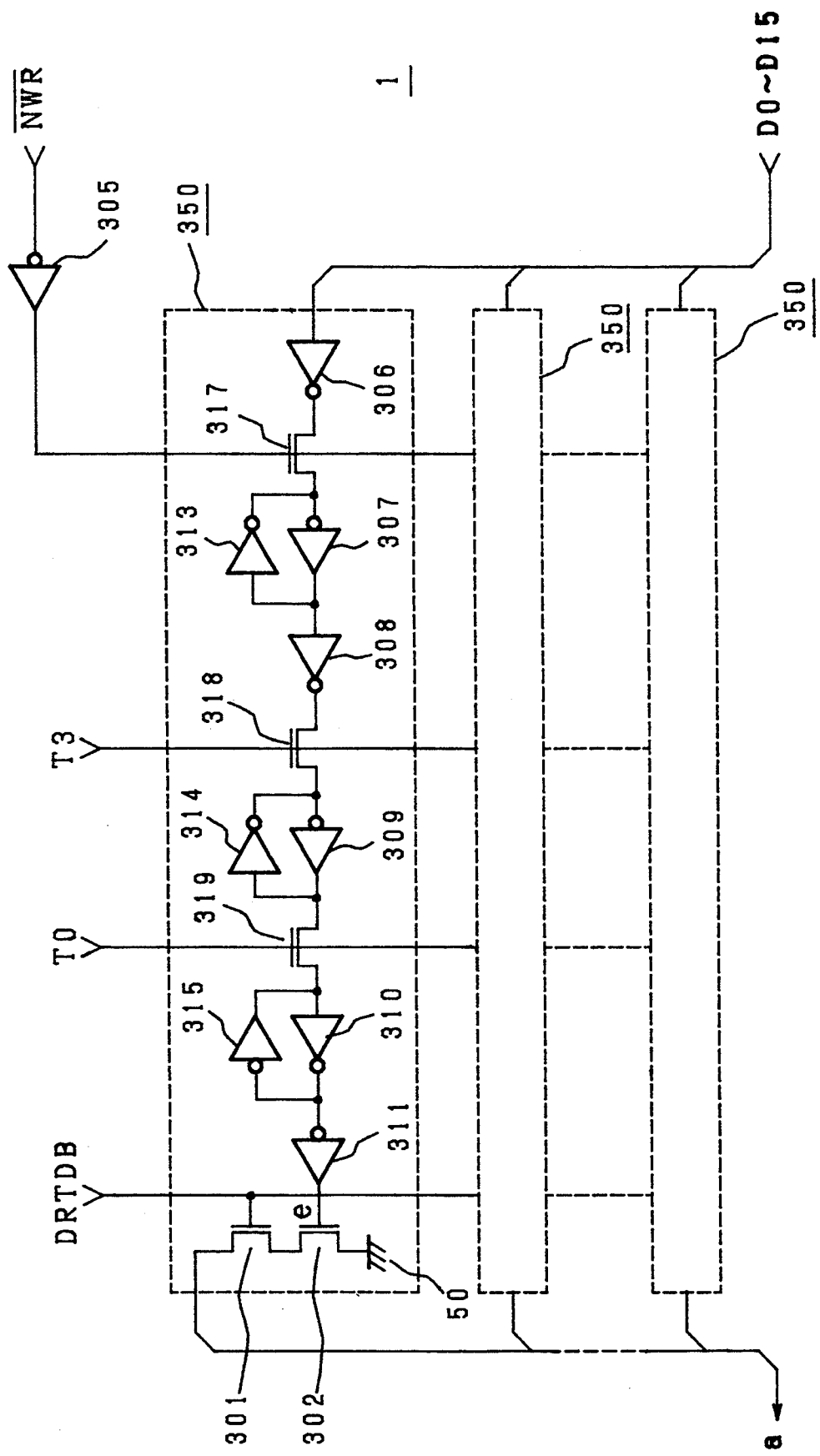
FIG. 12 is a circuit diagram in the case where a data register is materialized likewise by a MOS transistor.

Next, FIG. 12 shows a logical circuit configuration in the case where the data register 1 is materialized by MOS transistor logic.

In FIG. 12, numerals 301 and 302 designate N-channel-type MOS transistors having a small output resistance and a large driving ability. Numerals 305 to 311 and 313 to 315 designate inverters, and the inverters 313 to 315 have a driving ability smaller than that of the inverters 305 to 311. Numerals 317 to 319 designate transfer gates using an N-channel-type MOS transistor respectively. Numeral 350 designates a portion of the data register corresponding to one bit of an input parallel signal.

Next, description is made on operation of the data register 1 constituted as shown in FIG. 12.

FIG. 13 shows timing charts of the data register write signal $\overline{NRW}$(a), the parallel input signals D0 to D15(b), an internal synchronizing signal T0(c), another internal synchronizing signal T1(d), still another internal synchronizing signal T3(e), an output signal e of the inverter 311(f), a control signal DRTDB(g) for transmitting the contents of the data register 1 to the internal bus 8 and the data register output signal a(h).

When the write signal $\overline{NRW}$ the data register 1 is held at the low logical level (GND), the inverter 305 sets the gate signal of the transfer gate 317 to the high logical level ($V_{DD}$), and the inverter 306 transmits the values of the parallel data input signals D0 to D15 to a latch constituted with the inverters 307 and 313 through the transfer gate 317 to hold them. Thereafter, while the internal synchronizing signals T3 and T0 are turned sequentially to the high logical level ($V_{DD}$), the output signal of the inverter 307 is transmitted through the inverter 308, the transfer gate 318, the inverters 309 and 314, the transfer gate 319, the inverters 310 and 315 and the inverter 311, and the inverter 311 gives the output signal e to the gate of the N-channel-type MOS transistor 302 as an input signal.

Thereafter, at a time t35 when the data register indirect jump instruction is executed, at a point when the control signal DRTDB for transmitting the contents of the data register 1 to the internal bus 8 is turned to the high logical level ($V_{DD}$), the output signal a is outputted to the internal bus 8 according to the logical level of the N-channel-type MOS transistor 302. Then, this signal is transferred to the program counter 3 through the internal bus 9.

As described above, the address set in the data register 1 from the parallel input terminal 12 before resetting is set in the program counter 3 through the internal buses 8 and 9 when the data register indirect jump instruction is executed.

As detailed above, in accordance with the present invention, by resetting the microprocessor, the program can be re-executed from an arbitrary instruction address, and limitation to program arrangement in the instruction space is eliminated, and thus flexibility is increased in address setting.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. In a computer with a processor having a reset state, the computer having
    a processing unit for receiving a first control signal and a first select signal and outputting an internal reset signal and a second select signal
    an instruction execution device,
    a first instruction source,
    a predetermined instruction source,
    a selecting device coupling said instruction sources to said instruction execution device for selecting an instruction from said first instruction source or said predetermined instruction source, in response to said second select signal,
    a program counter for indicating the next instruction to be executed,
    a data register for receiving data in response to
a write signal, a method for performing a reset comprising:
setting said write signal active;
setting said first control signal active to initiate a reset of said processor and placing said processor in said reset state;
receiving in said data register an indication of an address after the first control signal is set active;
setting said internal reset signal active, in response to said setting of said first control signal;
setting said second select signal inactive in response to said setting of said first control signal;
setting said first select signal active, after said step of setting said second select signal inactive;
setting said first control signal inactive after said step of setting said first select signal active;
setting said internal reset signal inactive in response to said setting of said first control signal inactive;
setting said second select signal active, in response to said setting of said first control signal inactive, wherein said selecting device selects said predetermined instruction;
executing said instruction selected by said selecting device in said instruction execution device, wherein execution of said instruction causes transfer of said address to said program counter; and
executing an instruction indicated by the contents of said program counter, following said step of executing the instruction selected by said selecting device.

* * * * *